Patented Oct. 9, 1934

1,976,225

UNITED STATES PATENT OFFICE 1,976,225

REFINING WHITE METAL SCRAP

George O. Hiers, Brooklyn, N. Y., assignor to National Lead Company, New York, N. Y., a corporation of New Jersey No Drawing. Application July 19, 1930,
Serial No. 469,254

3 Claims. (Cl. 75—15)

The invention relates to the refining or treating of "white metal" or tin- or lead-base alloys for the purpose of separating therefrom certain ingredient metals regarded as undesirable or as impurities and commonly such as antimony, copper, arsenic and iron, and more particularly, to the recovery of such impurity metals from the mush produced by mixing aluminum with such white metal alloys according to the process described and claimed in a companion application by William A. Cowan, Serial No. 469,251, filed July 19, 1930.

The process referred to is briefly as follows: The existing relative proportion of the impurity metal or metals present in the alloy to be treated is first ascertained and then there is added thereto or combined therewith, while in a molten state, a predetermined quantity of aluminum and vigorously stirred therein, the temperature being raised to the point where such aluminum reacts with the impurity metal or metals. The reaction results in the formation of definite chemical compounds of aluminum with such impurity metal or metals as may be present, having a composition corresponding closely to the general formulas AlSb and AlCu₂ etc. After the aluminum reaction, the metal is allowed to cool to a point below that at which the bulk of aluminum compounds referred to are soluble therein, about 300° C., which causes all of the products of the reaction between the aluminum and the impurity metal or metals to collect and float high upon the molten mass in the form of a thick mush. This mush is then separated from the liquid metal, gravitationally, in a filter, or by mixing a drying agent therein, or otherwise to remove therefrom the excess, or as much as possible, of the original liquid metal which wets the mush particles, and after such separation, the mush represents the principal by-product of the process referred to.

According to this invention the metallic values of such by-product are recovered by smelting it, preferably in a reverberatory furnace, in contact with metallic oxides or sulphides, preferably the oxides or sulphides of one or more of the metals already present in the mush material, other than aluminum. According to the character of the original white metal alloy, there may be one or more of the impurity metals such as Sb, As, Cu or Fe in the mush material, accompanied by more or less of the lead or tin from which the mush was filtered or separated. The smelting operation is exothermic and results in the reduction of the added metallic oxide to metallic form, breaking up the mush material into aluminum oxide and metallic antimony, copper, arsenic, etc. as the case may be, and according to the general reaction illustrated by the following equations; MO being used in these equations as the symbol of the added metallic oxide and being understood to represent the oxide of the particular metal used for the purpose:

$$2AlSb + 3MO = 3M + 2Sb + Al_2O_3$$

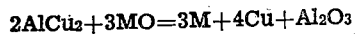

$$2AlCu_2 + 3MO = 3M + 4Cu + Al_2O_3$$

it being understood that if other impurity metals are in the by-product they will, of course, appear in the reaction according to the same principle. On removal of the aluminum bearing slag the remaining product metal is ready for further manufacture or sale according to its composition.

A specific example of the process is as follows,— assuming the separated mush material to have the following composition:

60 AlSb
10 Sn
30 Pb

On the basis of 100 pounds of the above there is added 136 pounds of PbO (or dross containing an equal amount of PbO). The materials in these proportions are charged into a reverberatory furnace and smelted therein. The aluminum oxide (Al₂O₃) produced with a liberation of heat is removed as slag and the resultant metal tapped off. The product metal in this case is an alloy of lead, tin, and antimony (71, 5, 24) which, when added to lead, has a market value. Another specific example of the process is as follows,—assuming the separated mush material to have the following composition:

60 AlSb
10 Sn
30 Pb

On the basis of 100 pounds of the above there is added 145 pounds of PbS. The materials in these proportions are charged into a reverberatory furnace and smelted therein. The aluminum sulphide (Al₂S₃) produced with a liberation of heat is removed as matte and the resultant metal tapped off. The product metal in this case is an alloy of lead, tin, and antimony (71%—5%—24%) which, when added to lead, has a market value.

In view of the fact that the atomic weight of aluminum is 27 and of antimony 121.8, it will be apparent that, roughly speaking, the proportion of aluminum in the mush compound treated is approximately 12%, and with such minor proportion of aluminum, it will be further apparent that the temperature of the reaction is sufficiently low to avoid volatilization of the lead or other metals in the melt.

I claim:

1. A step in the process of recovering Sb, As, Cu or Fe present as impurity in tin and lead-base alloys by reacting with aluminum with such impurity metal or metals, which consists in separating the aluminum compound mush produced in said reaction and causing it to react with an oxide or sulphide of one of the metals other than aluminum which are contained in said mush, at a temperature less than the volatilizing point of said metals.

2. The process of recovering Sb, As, Cu or Fe present as impurity in tin and lead-base alloys which comprises reacting with aluminum on such impurity metal or metals, eliminating the liquid wetting metal from the mush aluminum compound produced in such reaction and heating the resulting dried mush in the presence of an oxide or sulphide of a metal other than aluminum present in said mush, thereby converting to oxide or sulfide the aluminum in said compound without volatilizing said metals.

3. The process of producing a lead alloy rich in antimony out of secondary lead containing antimony which consists in stirring aluminum into said secondary lead to produce therein a mush compound of aluminum and antimony, separating such compound and heating it with an oxide or sulfide of lead to remove the aluminum therefrom and leave the antimony alloyed with the lead.

GEORGE O. HIERS.